(12) United States Patent
Wang et al.

(10) Patent No.: US 9,273,219 B2
(45) Date of Patent: Mar. 1, 2016

(54) POLYOLEFIN BLEND COMPOSITION

(71) Applicant: Dow Global Technologies LLC, Midland, MI (US)

(72) Inventors: Jian Wang, Rosharon, TX (US); Mridula Kapur, Lake Jackson, TX (US); James L. Cooper, Brazoria, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/422,036

(22) PCT Filed: Oct. 1, 2013

(86) PCT No.: PCT/US2013/062821
§ 371 (c)(1),
(2) Date: Feb. 17, 2015

(87) PCT Pub. No.: WO2014/058658
PCT Pub. Date: Apr. 17, 2014

(65) Prior Publication Data
US 2015/0232680 A1   Aug. 20, 2015

Related U.S. Application Data

(60) Provisional application No. 61/713,153, filed on Oct. 12, 2012.

(51) Int. Cl.
*C08L 23/06* (2006.01)
*C08L 23/08* (2006.01)
*C09D 123/08* (2006.01)
*B32B 27/32* (2006.01)

(52) U.S. Cl.
CPC ........ *C09D 123/0815* (2013.01); *C08L 23/0815* (2013.01); *B32B 27/32* (2013.01); *C08L 23/06* (2013.01)

(58) Field of Classification Search
CPC ...... C08L 23/06; C08L 23/0815; B32B 27/32
USPC ........................................................ 525/240
See application file for complete search history.

(56) References Cited

U.S. PATENT DOCUMENTS

| 6,800,692 | B2 | 10/2004 | Farley et al. |
| 7,776,987 | B2 | 8/2010 | Oswald et al. |
| 8,889,794 | B2 * | 11/2014 | Wang ............................. 525/240 |
| 2009/0192270 | A1 | 7/2009 | Malakoff et al. |
| 2010/0317804 | A1 | 12/2010 | Karjala et al. |
| 2014/0248811 | A1 * | 9/2014 | Degroot et al. ............... 442/170 |
| 2015/0210840 | A1 * | 7/2015 | Kapur et al. |

FOREIGN PATENT DOCUMENTS

WO    2010/144784 A1    12/2010

OTHER PUBLICATIONS

Dow Global Technologies LLC, EP Appln. No. 13779453.3, Rejection dated May 15, 2015.
PCT/US2013/062821, International Search Report & Written Opinion of the International Searching Authority mailed Nov. 28, 2013.
PCT/US2013/062821, International Preliminary Report on Patentability mailed Apr. 23, 2015.

* cited by examiner

Primary Examiner — Rip A Lee (57) ABSTRACT

The instant invention provides a polyolefin blend composition suitable for extrusion coating or extrusion lamination applications, and multilayer structure and articles made therefrom. The polyolefin blend composition suitable for extrusion coating or extrusion lamination applications according to the present invention comprises (a) a linear low density polyethylene composition comprising: less than or equal to 100 percent by weight of the units derived from ethylene; less than 35 percent by weight of units derived from one or more ?-olefin comonomers; wherein said polyethylene composition has a density in the range of 0.890 to 0.940 g/cm3, a molecular weight distribution (Mw/Mn) in the range of 2.5 to 4.5, a melt index (I2) in the range of 4 to 30 g/10 minutes, a molecular weight distribution (Mz/Mw) in the range of from 2.0 to 3, vinyl unsaturation of less than 0.1 vinyls per one thousand carbon atoms present in the backbone of said composition, and a zero shear viscosity ratio (ZSVR) in the range from 1 to 1.2; and (b) less than 50 percent by weight of a low density polyethylene composition having a density in the range of 0.915 to 0.930 g/cm3, a melt index (I2) in the range of 0.1 to 10 g/10 minutes, and a molecular weight distribution (Mw/Mn) in the range of 6 to 15.

2 Claims, 3 Drawing Sheets

POLYOLEFIN BLEND COMPOSITION

REFERENCE TO RELATED APPLICATIONS

The present application claims the benefit of U.S. Provisional Application No. 61/713,153, filed on Oct. 12, 2012.

FIELD OF INVENTION

The instant invention relates to a polyolefin blend composition suitable for extrusion coating or extrusion lamination applications, and multilayer structure and articles made therefrom.

BACKGROUND OF THE INVENTION

The use of polyethylene compositions, such as linear low density polyethylenes and/or high density polyethylenes, in fabrication of films and/or coating layers is generally known. Any conventional method, such as gas phase process, slurry process, or solution process, may be employed to produce such polyethylene compositions. In addition, any conventional method, such as cast film extrusion process, extrusion coating process, and/or extrusion lamination process may be employed to produce such films and/or coating layers.

Despite the research efforts in improving properties of extrusion coated or extrusion laminated articles, there is still a need for improving interlayer bonding while maintaining acceptable neck-in and drawdown performance properties.

SUMMARY OF THE INVENTION

The instant invention provides a polyolefin blend composition suitable for extrusion coating or extrusion lamination applications, and multilayer structure and articles made therefrom.

In one embodiment, the instant invention provides a polyolefin blend composition suitable for extrusion coating or extrusion lamination applications comprising (a) a linear low density polyethylene composition comprising: less than or equal to 100 percent by weight of the units derived from ethylene; less than 35 percent by weight of units derived from one or more α-olefin comonomers; wherein said polyethylene composition has a density in the range of 0.890 to 0.940 g/cm$^3$, a molecular weight distribution ($M_w/M_n$) in the range of 2.5 to 4.5, a melt index ($I_2$) in the range of 4 to 30 g/10 minutes, a molecular weight distribution ($M_z/M_w$) in the range of from 2.0 to 3, vinyl unsaturation of less than 0.1 vinyls per one thousand carbon atoms present in the backbone of said composition, and a zero shear viscosity ratio (ZSVR) in the range from 1 to 1.2; and (b) less than 50 percent by weight of a low density polyethylene composition having a density in the range of 0.915 to 0.930 g/cm$^3$, a melt index ($I_2$) in the range of 0.1 to 10 g/10 minutes, and a molecular weight distribution ($M_w/M_n$) in the range of 6 to 15.

In an alternative embodiment, the instant invention further provides an article comprising: a substrate, and a coating layer associate with at least one surface of said substrate comprising a polyolefin blend composition comprising: (a) a linear low density polyethylene composition comprising: less than or equal to 100 percent by weight of the units derived from ethylene; and less than 35 percent by weight of units derived from one or more α-olefin comonomers; wherein said polyethylene composition has a density in the range of 0.890 to 0.940 g/cm$^3$, a molecular weight distribution ($M_w/M_n$) in the range of 2.5 to 4.5, a melt index ($I_2$) in the range of 4 to 30 g/10 minutes, a molecular weight distribution ($M_z/M_w$) in the range of from 2.0 to 3, vinyl unsaturation of less than 0.1 vinyls per one thousand carbon atoms present in the backbone of said composition, and a zero shear viscosity ratio (ZSVR) in the range from 1 to 1.2; and (b) less than 50 percent by weight of a low density polyethylene composition having a density in the range of 0.915 to 0.930 g/cm$^3$, a melt index ($I_2$) in the range of 0.1 to 10 g/10 minutes, and a molecular weight distribution ($M_w/M_n$) in the range of 6 to 15.

In an alternative embodiment, the instant invention further provides a multilayer structure comprising: a substrate, and a coating layer associate with at least one surface of said substrate comprising a polyolefin blend composition comprising: (a) a linear low density polyethylene composition comprising: less than or equal to 100 percent by weight of the units derived from ethylene; and less than 35 percent by weight of units derived from one or more α-olefin comonomers; wherein said polyethylene composition has a density in the range of 0.890 to 0.940 g/cm$^3$, a molecular weight distribution ($M_w/M_n$) in the range of 2.5 to 4.5, a melt index ($I_2$) in the range of 4 to 30 g/10 minutes, a molecular weight distribution ($M_z/M_w$) in the range of from 2.0 to 3, vinyl unsaturation of less than 0.1 vinyls per one thousand carbon atoms present in the backbone of said composition, and a zero shear viscosity ratio (ZSVR) in the range from 1 to 1.2; and (b) less than 50 percent by weight of a low density polyethylene composition having a density in the range of 0.915 to 0.930 g/cm$^3$, a melt index ($I_2$) in the range of 0.1 to 10 g/10 minutes, and a molecular weight distribution ($M_w/M_n$) in the range of 6 to 15.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

The instant invention provides a polyolefin blend composition suitable for extrusion coating or extrusion lamination applications, and multilayer structure and articles made therefrom.

In one embodiment, the instant invention provides a polyolefin blend composition suitable for extrusion coating or extrusion lamination applications comprising (a) a linear low density polyethylene composition comprising: less than or equal to 100 percent by weight of the units derived from ethylene; less than 35 percent by weight of units derived from one or more α-olefin comonomers; wherein said polyethylene composition has a density in the range of 0.890 to 0.940 g/cm$^3$, a molecular weight distribution ($M_w/M_n$) in the range of 2.5 to 4.5, a melt index ($I_2$) in the range of 4 to 30 g/10 minutes, a molecular weight distribution ($M_z/M_w$) in the range of from 2.0 to 3, vinyl unsaturation of less than 0.1 vinyls per one thousand carbon atoms present in the backbone of said composition, and a zero shear viscosity ratio (ZSVR) in the range from 1 to 1.2; and (b) less than 50 percent by weight of a low density polyethylene composition having a density in the range of 0.915 to 0.930 g/cm$^3$, a melt index ($I_2$) in the range of 0.1 to 10 g/10 minutes, and a molecular weight distribution ($M_w/M_n$) in the range of 6 to 15.

Linear Low Density Polyethylene Composition Component

The linear low density polyethylene composition is substantially free of any long chain branching, and preferably, the linear low density polyethylene composition is free of any long chain branching. Substantially free of any long chain branching, as used herein, refers to a linear low density polyethylene composition preferably substituted with less than about 0.1 long chain branching per 1000 total carbons, and more preferably, less than about 0.01 long chain branching per 1000 total carbons.

The term (co)polymerization, as used herein, refers to the polymerization of ethylene and optionally one or more comonomers, e.g. one or more α-olefin comonomers. Thus, the term (co)polymerization refers to both polymerization of ethylene and copolymerization of ethylene and one or more comonomers, e.g. one or more α-olefin comonomers.

The polyethylene blend composition suitable for blown film according to the present invention comprises 90 percent or greater by weight of the linear low density polyethylene (LLDPE); for example, from 96 to 99.5 weight percent; or in the alternative, from 97 to 99.5 weight percent; or in the alternative, from 96.5 to 99 weight percent. The LLDPE comprises (a) less than or equal to 100 percent, for example, at least 65 percent, at least 70 percent, or at least 80 percent, or at least 90 percent, by weight of the units derived from ethylene; and (b) less than 35 percent, for example, less than 25 percent, or less than 20 percent, by weight of units derived from one or more α-olefin comonomers.

The linear low density polyethylene composition according to instant invention has a density in the range of from 0.890 to 0.940. All individual values and subranges from 0.890 to 0.940 g/cm$^3$ are included herein and disclosed herein; for example, the density can be from a lower limit of 0.890, 0.903, or 0.905 g/cm$^3$ to an upper limit of 0.910, 0.920, 0.925, 0.935, 0.940 g/cm$^3$.

The linear low density polyethylene composition according to instant invention is characterized by having a zero shear viscosity ratio (ZSVR) in the range from 1 to 1.2.

The linear low density polyethylene composition according to the instant invention has a molecular weight distribution ($M_w/M_n$) (measured according to the conventional gel permeation chromatography (GPC) method) in the range of 2.5 to 4.5. All individual values and subranges from 2.5 to 4.5 are included herein and disclosed herein; for example, the molecular weight distribution ($M_w/M_n$) can be from a lower limit of 2.5, 2.7, or 2.9 to an upper limit of 3.2, 3.6, 3.8, 3.9, 4.2, 4.4, or 4.5.

The linear low density polyethylene composition according to the instant invention has a melt index ($I_2$) in the range of from of 4 to 30 g/10 minutes. All individual values and subranges from 4 to 30 g/10 minutes are included herein and disclosed herein; for example, the melt index ($I_2$) can be from a lower limit of 4, 8, 10, 15, or 18 g/10 minutes to an upper limit of 25, 27, or 30 g/10 minutes.

The linear low density polyethylene composition according to the instant invention has a molecular weight ($M_w$) in the range of 25,000 to 125,000 daltons. All individual values and subranges from 25,000 to 125,000 daltons are included herein and disclosed herein; for example, the molecular weight ($M_w$) can be from a lower limit of 25,000, 35,000, or 40,000 daltons to an upper limit of 75,000, 100,000, or 125,000 daltons.

The linear low density polyethylene composition may have molecular weight distribution ($M_z/M_w$) (measured according to the conventional GPC method) in the range of from 2.0 to 3. All individual values and subranges from 2.0 to 3 are included herein and disclosed herein.

The linear low density polyethylene composition may have a vinyl unsaturation of less than 0.1 vinyls per one thousand carbon atoms present in the linear low density polyethylene composition. All individual values and subranges from less than 0.1 are included herein and disclosed herein; for example, the linear low density polyethylene composition may have a vinyl unsaturation of less than 0.08 vinyls per one thousand carbon atoms present in the linear low density polyethylene composition.

The linear low density polyethylene composition may comprise less than 35 percent by weight of units derived from one or more α-olefin comonomers. All individual values and subranges from less than 35 weight percent are included herein and disclosed herein; for example, the linear low density polyethylene composition may comprise less than 25 percent by weight of units derived from one or more α-olefin comonomers; or in the alternative, the linear low density polyethylene composition may comprise less than 15 percent by weight of units derived from one or more α-olefin comonomers; or in the alternative, the linear low density polyethylene composition may comprise less than 14 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The linear low density polyethylene composition may comprise at least 65 percent by weight of units derived from ethylene. All individual values and subranges from at least 75 weight percent are included herein and disclosed herein; for example, the linear low density polyethylene composition may comprise at least 85 percent by weight of units derived from ethylene; or in the alternative, the linear low density polyethylene composition may comprise less than 100 percent by weight of units derived from ethylene.

The linear low density polyethylene composition may further comprise less than or equal to 100 parts by weight of hafnium residues remaining from the hafnium based metallocene catalyst per one million parts of linear low density polyethylene composition. All individual values and subranges from less than or equal to 100 ppm are included herein and disclosed herein; for example, the linear low density polyethylene composition may further comprise less than or equal to 10 parts by weight of hafnium residues remaining from the hafnium based metallocene catalyst per one million parts of linear low density polyethylene composition; or in the alternative, the linear low density polyethylene composition may further comprise less than or equal to 8 parts by weight of hafnium residues remaining from the hafnium based metallocene catalyst per one million parts of linear low density polyethylene composition; or in the alternative, the linear low density polyethylene composition may further comprise less than or equal to 6 parts by weight of hafnium residues remaining from the hafnium based metallocene catalyst per one million parts of linear low density polyethylene composition; or in the alternative, the linear low density polyethylene composition may further comprise less than or equal to 4 parts by weight of hafnium residues remaining from the hafnium based metallocene catalyst per one million parts of linear low density polyethylene composition; or in the alternative, the linear low density polyethylene composition may further comprise less than or equal to 2 parts by weight of hafnium residues remaining from the hafnium based metallocene catalyst per one million parts of linear low density polyethylene composition; or in the alternative, the linear low density polyethylene composition may further comprise less than or equal to 1.5 parts by weight of hafnium residues remaining from the hafnium based metallocene catalyst per one million parts of linear low density polyethylene composition; or in the alternative, the linear low density polyethylene composition may further comprise less than or equal to 1 parts by weight of hafnium residues remaining from the hafnium based metallocene catalyst per one million parts of linear low density polyethylene composition; or in the alternative, the linear low density polyethylene composition may further comprise less than or equal to 0.75 parts by weight of hafnium residues remaining from the hafnium based metallocene catalyst per one million parts of linear low density polyethylene composition; or in the alternative, the linear low density polyethylene composition may further comprise less than or equal to 0.5 parts by weight of hafnium residues remaining from the hafnium based metallocene catalyst per one million parts of linear low density polyethylene composition the linear low density polyethylene composition may further comprise less than or equal to 0.25 parts by weight of hafnium residues remaining from the hafnium based metallocene catalyst per one million parts of linear low density polyethylene composition. The hafnium residues remaining from the hafnium based metallocene catalyst in the linear low density polyethylene composition may be measured by x-ray fluorescence (XRF), which is calibrated to reference standards. The polymer resin granules were compression molded at elevated temperature into plaques having a thickness of about ⅜ of an inch for the x-ray measurement in a preferred method. At very low concentrations of metal, such as below 0.1 ppm, ICP-AES would be a suitable method to determine metal residues present in the linear low density polyethylene composition. In one embodiment, the linear low density polyethylene composition has substantially no chromium, zirconium or titanium content, that is, no or only what would be considered by those skilled in the art, trace amounts of these metals are present, such as, for example, less than 0.001 ppm.

The linear low density polyethylene composition may further comprise additional additives. Such additives include, but are not limited to, one or more hydrotalcite based neutralizing agents, antistatic agents, color enhancers, dyes, lubricants, fillers, pigments, primary antioxidants, secondary antioxidants, processing aids, UV stabilizers, nucleators, and combinations thereof. The inventive polyethylene composition may contain any amounts of additives. The linear low density polyethylene composition may comprise from about 0 to about 10 percent by the combined weight of such additives, based on the weight of the linear low density polyethylene composition including such additives. All individual values and subranges from about 0 to about 10 weight percent are included herein and disclosed herein; for example, the linear low density polyethylene composition may comprise from 0 to 7 percent by the combined weight of additives, based on the weight of the linear low density polyethylene composition including such additives; in the alternative, the linear low density polyethylene composition may comprise from 0 to 5 percent by the combined weight of additives, based on the weight of the linear low density polyethylene composition including such additives; or in the alternative, the linear low density polyethylene composition may comprise from 0 to 3 percent by the combined weight of additives, based on the weight of the linear low density polyethylene composition including such additives; or in the alternative, the linear low density polyethylene composition may comprise from 0 to 2 percent by the combined weight of additives, based on the weight of the linear low density polyethylene composition including such additives; or in the alternative, the linear low density polyethylene composition may comprise from 0 to 1 percent by the combined weight of additives, based on the weight of the linear low density polyethylene composition including such additives; or in the alternative, the linear low density polyethylene composition may comprise from 0 to 0.5 percent by the combined weight of additives, based on the weight of the linear low density polyethylene composition including such additives.

Any conventional ethylene (co)polymerization reaction may be employed to produce such linear low density polyethylene compositions. Such conventional ethylene (co)polymerization reactions include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof. For example, the linear low density polyethylene composition may be produced via gas phase polymerization process in a single gas phase reactor; however, the production of such linear low density polyethylene compositions is not so limited to gas phase polymerization process, and any of the above polymerization processes may be employed. In one embodiment, the polymerization reactor may comprise of two or more reactors in series, parallel, or combinations thereof. Preferably, the polymerization reactor is one reactor, e.g. a fluidized bed gas phase reactor. In another embodiment, the gas phase polymerization reactor is a continuous polymerization reactor comprising one or more feed streams. In the polymerization reactor, the one or more feed streams are combined together, and the gas comprising ethylene and optionally one or more comonomers, e.g. one or more α-olefins, are flowed or cycled continuously through the polymerization reactor by any suitable means. The gas comprising ethylene and optionally one or more comonomers, e.g. one or more α-olefins, may be fed up through a distributor plate to fluidize the bed in a continuous fluidization process.

In production, a hafnium based metallocene catalyst system including a cocatalyst, as described hereinbelow in further details, ethylene, optionally one or more alpha-olefin comonomers, hydrogen, optionally one or more inert gases and/or liquids, e.g. $N_2$, isopentane, and hexane, and optionally one or more continuity additive, e.g. ethoxylated stearyl amine or aluminum distearate or combinations thereof, are continuously fed into a reactor, e.g. a fluidized bed gas phase reactor. The reactor may be in fluid communication with one or more discharge tanks, surge tanks, purge tanks, and/or recycle compressors. The temperature in the reactor is typically in the range of 70 to 115° C., preferably 75 to 110° C., more preferably 75 to 100° C., and the pressure is in the range of 15 to 30 atm, preferably 17 to 26 atm. A distributor plate at the bottom of the polymer bed provides a uniform flow of the upflowing monomer, comonomer, and inert gases stream. A mechanical agitator may also be provided to provide contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases are then cooled to remove the heat of polymerization, recompressed, and then recycled to the bottom of the reactor. Once the residual hydrocarbons are removed, and the resin is transported under $N_2$ to a purge bin, moisture may be introduced to reduce the presence of any residual catalyzed reactions with $O_2$ before the linear low density polyethylene composition is exposed to oxygen. The linear low density polyethylene composition may then be transferred to an extruder to be pelletized. Such pelletization techniques are generally known. The linear low density polyethylene composition may further be melt screened. Subsequent to the melting process in the extruder, the molten composition is passed through one or more active screens, positioned in series of more than one, with each active screen having a micron retention size of from about 2 μm to about 400 μm (2 to $4\times10^{-5}$ m), and preferably about 2 μm to about 300 μm (2 to $3\times10^{-5}$ m), and most preferably about 2 μm to about 70 μm (2 to $7\times10^{-6}$ m), at a mass flux of about 5 to about 100 lb/hr/in² (1.0 to about 20 kg/s/m²). Such further melt screening is disclosed in U.S. Pat. No. 6,485,662, which is incorporated herein by reference to the extent that it discloses melt screening.

In an embodiment of a fluidized bed reactor, a monomer stream is passed to a polymerization section. The fluidized bed reactor may include a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and optionally one or more α-olefin comonomers, and may also include condensing agents as is known in the art and disclosed in, for example, U.S. Pat. No. 4,543,399, U.S. Pat. No. 5,405,922, and U.S. Pat. No. 5,462,999.

The fluidized bed has the general appearance of a dense mass of individually moving particles, preferably polyethylene particles, as generated by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 m/sec and usually no more than 0.76 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. The gas exiting the overhead of the reactor is the recycle gas stream.

The recycle stream is compressed in a compressor and then passed through a heat exchange zone where heat is removed before the stream is returned to the bed. The heat exchange zone is typically a heat exchanger, which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes that contain liquid in the cycle gas stream and those that do not and vice versa. Such deflectors are described in the U.S. Pat. No. 4,933,149 and U.S. Pat. No. 6,627,713.

The hafnium based catalyst system used in the fluidized bed is preferably stored for service in a reservoir under a blanket of a gas, which is inert to the stored material, such as nitrogen or argon. The hafnium based catalyst system may be added to the reaction system, or reactor, at any point and by any suitable means, and is preferably added to the reaction system either directly into the fluidized bed or downstream of the last heat exchanger, i.e. the exchanger farthest downstream relative to the flow, in the recycle line, in which case the activator is fed into the bed or recycle line from a dispenser. The hafnium based catalyst system is injected into the bed at a point above distributor plate. Preferably, the hafnium based catalyst system is injected at a point in the bed where good mixing with polymer particles occurs. Injecting the hafnium based catalyst system at a point above the distribution plate facilitates the operation of a fluidized bed polymerization reactor.

The monomers can be introduced into the polymerization zone in various ways including, but not limited to, direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream, and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of linear low density polyethylene composition may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor, i.e. the difference between inlet fluid temperature and exit fluid temperature, is indicative of the rate of linear low density polyethylene composition formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas phase reactor embodiment, the reactor temperature of the fluidized bed process herein ranges from 70° C., or 75° C., or 80° C. to 90° C., or 95° C., or 100° C., or 110° C., or 115° C., wherein a desirable temperature range comprises any upper temperature limit combined with any lower temperature limit described herein. In general, the reactor temperature is operated at the highest temperature that is feasible, taking into account the sintering temperature of the inventive polyethylene composition within the reactor and fouling that may occur in the reactor or recycle line(s).

The above process is suitable for the production of homopolymers comprising ethylene derived units, or copolymers comprising ethylene derived units and at least one or more other α-olefin(s) derived units.

In order to maintain an adequate catalyst productivity in the present invention, it is preferable that the ethylene is present in the reactor at a partial pressure at or greater than 160 psia (1100 kPa), or 190 psia (1300 kPa), or 200 psia (1380 kPa), or 210 psia (1450 kPa), or 220 psia (1515 kPa).

The comonomer, e.g. one or more α-olefin comonomers, if present in the polymerization reactor, is present at any level that will achieve the desired weight percent incorporation of the comonomer into the finished polyethylene. This is expressed as a mole ratio of comonomer to ethylene as described herein, which is the ratio of the gas concentration of comonomer moles in the cycle gas to the gas concentration of ethylene moles in the cycle gas. In one embodiment of the inventive polyethylene composition production, the comonomer is present with ethylene in the cycle gas in a mole ratio range of from 0 to 0.1 (comonomer:ethylene); and from 0 to 0.05 in another embodiment; and from 0 to 0.04 in another embodiment; and from 0 to 0.03 in another embodiment; and from 0 to 0.02 in another embodiment.

Hydrogen gas may also be added to the polymerization reactor(s) to control the final properties (e.g., $I_{21}$ and/or $I_2$) of the inventive linear low density polyethylene composition. In one embodiment, the ratio of hydrogen to total ethylene monomer (ppm $H_2$/mol % $C_2$) in the circulating gas stream is in a range of from 0 to 60:1 in one embodiment; from 0.10:1 (0.10) to 50:1 (50) in another embodiment; from 0 to 35:1 (35) in another embodiment; from 0 to 25:1 (25) in another embodiment; from 7:1 (7) to 22:1 (22).

In one embodiment, the process for producing a linear low density polyethylene composition comprises the steps of: (1) (co)polymerizing ethylene and optionally one or more α-olefin comonomer in the presence of a hafnium based metallocene catalyst via a gas phase (co)polymerization process in a single stage reactor; and (2) thereby producing the linear low density polyethylene composition.

The hafnium based catalyst system, as used herein, refers to a catalyst capable of catalyzing the polymerization of ethylene monomers and optionally one or more α-olefin co monomers to produce polyethylene. Furthermore, the hafnium based catalyst system comprises a hafnocene component. The hafnocene component may comprise mono-, bis- or tris-cyclopentadienyl-type complexes of hafnium. In one embodiment, the cyclopentadienyl-type ligand comprises cyclopentadienyl or ligands isolobal to cyclopentadienyl and substituted versions thereof. Representative examples of ligands isolobal to cyclopentadienyl include, but are not limited to, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind") and substituted versions thereof. In one embodiment, the hafnocene component is an unbridged bis-cyclopentadienyl hafnocene and substituted versions thereof. In another embodiment, the hafnocene component excludes unsubstituted bridged and unbridged bis-cyclopentadienyl hafnocenes, and unsubstituted bridged and unbridged bis-indenyl hafnocenes. The term "unsubstituted," as used herein, means that there are only hydride groups bound to the rings and no other group. Preferably, the hafnocene useful in the present invention can be represented by the formula (where "Hf" is hafnium):

$$Cp_nHfX_p \quad (1)$$

wherein n is 1 or 2, p is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silyl-hydrocarbons, and siloxyl-hydrocarbons. An example of $C_1$ to $C_5$ alkylenes include ethylene (—$CH_2CH_2$—) bridge groups; an example of an alkylamine bridging group includes methylamide (—($CH_3$)N—); an example of a silyl-hydrocarbon bridging group includes dimethylsilyl (—($CH_3$)$_2$Si—); and an example of a siloxyl-hydrocarbon bridging group includes (—O—($CH_3$)$_2$Si—O—). In one particular embodiment, the hafnocene component is represented by formula (1), wherein n is 2 and p is 1 or 2.

As used herein, the term "substituted" means that the referenced group possesses at least one moiety in place of one or more hydrogens in any position, the moieties selected from such groups as halogen radicals such as F, Cl, Br., hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof. More preferably, the hafnocene component useful in the present invention can be represented by the formula:

$$(CpR_5)_2HfX_2 \quad (2)$$

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and $C_2$ to $C_{12}$ alkenyls, and more preferably X is selected from the group consisting of halides, $C_2$ to $C_6$ alkylenes and $C_1$ to $C_6$ alkyls, and most preferably X is selected from the group consisting of chloride, fluoride, $C_1$ to $C_5$ alkyls and $C_2$ to $C_6$ alkylenes. In a most preferred embodiment, the hafnocene is represented by formula (2) above, wherein at least one R group is an alkyl as defined above, preferably a $C_1$ to $C_5$ alkyl, and the others are hydrides. In a most preferred embodiment, each Cp is independently substituted with from one two three groups selected from the group consisting of methyl, ethyl, propyl, butyl, and isomers thereof.

In one embodiment, the hafnocene based catalyst system is heterogeneous, i.e. the hafnocene based catalyst may further comprise a support material. The support material can be any material known in the art for supporting catalyst compositions; for example an inorganic oxide; or in the alternative, silica, alumina, silica-alumina, magnesium chloride, graphite, magnesia, titania, zirconia, and montmorillonite, any of which can be chemically/physically modified such as by fluoriding processes, calcining or other processes known in the art. In one embodiment the support material is a silica material having an average particle size as determined by Malvern analysis of from 1 to 60 mm; or in the alternative, 10 to 40 mm.

The hafnium based catalyst system may further comprise an activator. Any suitable activator known to activate catalyst components towards olefin polymerization may be suitable. In one embodiment, the activator is an alumoxane; in the alternative methalumoxane such as described by J. B. P. Soares and A. E. Hamielec in 3(2) POLYMER REACTION ENGINEERING 131 200 (1995). The alumoxane may preferably be co-supported on the support material in a molar ratio of aluminum to hafnium (Al:Hf) ranging from 80:1 to 200:1, most preferably 90:1 to 140:1.

Such hafnium based catalyst systems are further described in details in the U.S. Pat. No. 6,242,545 and U.S. Pat. No. 7,078,467, incorporated herein by reference.

Low Density Polyethylene Composition Component

The polyolefin blend composition suitable for extrusion coating or extrusion lamination applications according to the present invention comprises from less than 50 percent by weight of a low density polyethylene (LDPE); for example, from 20 to 40 weight percent; or in the alternative, from 25 to 35 weight percent. The low density polyethylene has a density in the range of from 0.915 to 0.930 g/cm³; for example, from 0.915 to 0.925 g/cm³; or in the alternative, from 0.918 to 0.922 g/cm³. The low density polyethylene has a melt index ($I_2$) in the range of from 0.1 to 5 g/10 minutes; for example, from 0.5 to 3 g/10 minutes; or in the alternative, from 1.5 to 2.5 g/10 minutes. The low density polyethylene has a molecular weight distribution ($M_w/M_n$) in the range of from 6 to 15; for example, from 6 to 12; or in the alternative, from 8 to 15; or in the alternative, from 8 to 12. Such low density polyethylene compositions are commercially available, for example, from The Dow Chemical Company.

The LDPE component has a long chin branching of at least 2 per 1000 carbon and/or up to 4 per 1000 carbon. The LDPE component has a peak at 32.7 ppm measured via $^{13}$C NMR indicating the presence of the $C_3$ carbon of a $C_5$ or amyl branch in the LDPE component.

Process Producing the Polyolefin Blend Composition

The polyolefin blend composition may be prepared via any conventional melt blending process such as extrusion via an extruder, e.g. single or twin screw extruder. The LDPE, LLDPE, and optionally one or more additives may be melt blended in any order via one or more extruders to form a uniform polyolefin blend composition. In the alternative, the LDPE, LLDPE, and optionally one or more additives may be dry blended in any order, and subsequently extruded to form a extrudate layer.

Additives

The polyolefin blend composition may further comprise one or more additional additives. Such additives include, but are not limited to, one or more hydrotalcite based neutralizing agents, one or more nucleating agents, one or more antistatic agents, one or more color enhancers, one or more dyes, one or more lubricants, one or more fillers, one or more pigments, one or more primary antioxidants, one or more secondary antioxidants, one or more processing aids, one or more UV stabilizers, and/or combinations thereof. The polyolefin blend composition may comprise any amounts of such additives. The polyolefin blend composition may comprise from about 0 to about 10 percent by the combined weight of such additives, based on the total weight of the polyolefin blend composition.

End-Use Applications

The polyolefin blend composition according to the present invention is suitable for extrusion coating process, extrusion lamination process, and cast film extrusion process.

In the extrusion coating process, the polyolefin blend composition according to the present invention is melted via, for example an extruder, and the molten polyolefin blend composition is applied to a moving substrate such as paper, paperboard, foil, or other polymeric films; thereby, producing a coated substrate or article.

In the extrusion lamination process, the polyolefin blend composition according to the present invention is melted via, for example an extruder, and the molten polyolefin blend composition is applied to at least 2 moving substrates to be glued together with the molten polyolefin blend composition.

In both extrusion coating and extrusion lamination processes, the traveling web(s) is (are) being pressed between a pressure loaded roll and a chill roll for quick quenching of the molten polyolefin blend composition. It is the job of the extrusion coating line to apply this molten film as a gel free uniform layer to yield a wrinkle-free substrate.

In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally it passes through a system of rollers and is wound onto a roll.

EXAMPLES

The following examples illustrate the present invention but are not intended to limit the scope of the invention. The examples of the instant invention demonstrate that the polyolefin blend compositions according to the present inventions facilitate interlayer bonding while maintaining acceptable neck-in and drawdown performance properties.

Inventive Composition 1

Inventive Composition 1 comprises (a) approximately 70 percent by weight of a linear low density polyethylene (LLDP1), which is an ethylene-hexene interpolymer, having a density of approximately 0.908 g/cm³, a melt index ($I_2$), measured at 190° C. and 2.16 kg, of approximately 21.1 g/10 minutes, a melt flow ratio ($I_{21}/I_2$) of approximately 27.5; and (b) approximately 30 percent by weight of a low density polyethylene (LDPE) having a density of approximately 0.918 g/cm³, a melt index ($I_2$), measured at 190° C. and 2.16 kg, of approximately 2.3 g/10 minutes.

The LLDPE1 component and LDPE component are compounded in an 18 mm twin screw extruder (micro-18). The twin screw extruder used is a Leistritz machine controlled by Haake software. The extruder has five heated zones, a feed zone, and a 3 mm strand die. The feed zone is cooled by flowing river water, while the remaining zones 1-5 and die are electrically heated and air cooled to 120, 135, 150, 190, 190, and 190° C. respectively. The pellet blend components are combined in a plastic bag and tumble blended by hand. After preheating the extruder, the load cell and die pressure transducers are calibrated. The drive unit for the extruder is run at 200 rpm which results by gear transfer to a screw speed of 250 rpm. The dry blend is then fed (6-8 lbs/hr) to the extruder through a twin auger K-Tron feeder model #K2VT20 using pellet augers. The hopper of the feeder is padded with nitrogen and the feed cone to the extruder is sealed with foil to minimize air intrusion to minimize possible oxygen degradation of the polymer. The resulting strand is water quenched, dried with an air knife, and pelletized with a Conair chopper to form the polyolefin blend composition 1. Additional properties of LLDPE-1, and the polyolefin blend composition 1 were measured, and are reported in Tables 1 and 2, respectively.

LLDPE1 was prepared via gasphase polymerization in a single fluidized bed reactor system according to the polymerization conditions reported in Table 3 in the presence of a hafnium based catalyst system, as described above, represented by the following structure:

Comparative Polyolefin Blend Composition A

Comparative Polyolefin Blend Composition A comprises (a) approximately 70 percent by weight of a comparative linear low density polyethylene (LLDPE-A), which is an ethylene-octene interpolymer, having a density of approximately 0.908 g/cm³, a melt index ($I_2$), measured at 190° C. and 2.16 kg, of approximately 21.6 g/10 minutes, a melt flow ratio ($I_{21}/I_2$) of approximately 22.0; and (b) approximately 30 percent by weight of a low density polyethylene (LDPE) having a density of approximately 0.918 g/cm³, a melt index ($I_2$), measured at 190° C. and 2.16 kg, of approximately 2.3 g/10 minutes.

The LLDPE-A component and LDPE component are compounded in an 18 mm twin screw extruder (micro-18). The twin screw extruder used is a Leistritz machine controlled by Haake software. The extruder has five heated zones, a feed zone, and a 3 mm strand die. The feed zone is cooled by flowing river water, while the remaining zones 1-5 and die are electrically heated and air cooled to 120, 135, 150, 190, 190, and 190° C. respectively. The pellet blend components are combined in a plastic bag and tumble blended by hand. After preheating the extruder, the load cell and die pressure transducers are calibrated. The drive unit for the extruder is run at 200 rpm which results by gear transfer to a screw speed of 250 rpm. The dry blend is then fed (6-8 lbs/hr) to the extruder through a twin auger K-Tron feeder model #K2VT20 using pellet augers. The hopper of the feeder is padded with nitrogen and the feed cone to the extruder is sealed with foil to minimize air intrusion to minimize possible oxygen degradation of the polymer. The resulting strand is water quenched, dried with an air knife, and pelletized with a Conair chopper to form the polyolefin blend composition A. Additional properties of LLDPE-A, and the polyolefin blend composition A were measured, and are reported in Tables 1 and 2, respectively.

Inventive Film 1

Inventive Film 1 was prepared via cast film process on a Collin cast film line (Type: Chill Roll, No. 4430-50-07) according to the process conditions reported in Table 4. Three-layer films were prepared by extruding (1) 25 percent by weight of a skin layer, based on the total weight of the three layer film, which was fabricated via extruder number 1, comprising Ultramid B40.01; (2) 50 percent by weight of a core layer, based on the total weight of the three layer film, which was fabricated via extruder number 2, comprising 90 percent by weight of ATTANE™ 4202 and 10 percent by weight of AMPLIFY™ GR-205, based on the total weight of the core layer; (3) 25 percent by weight of LLDPE1, as described above, based on the total weight of the three layer film, which was fabricated via extruder number 3.

Figure 1:
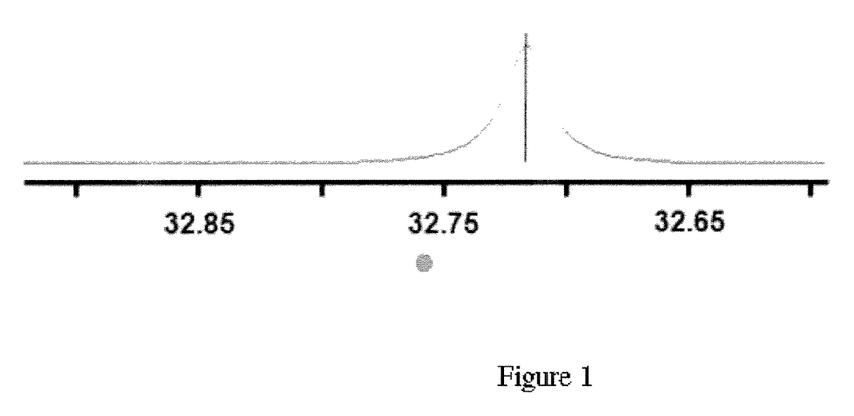
FIG. 1 reports the $^{13}$C NMR results for a low density polyethylene present in an inventive polyolefin blend composition.
Figure 2:
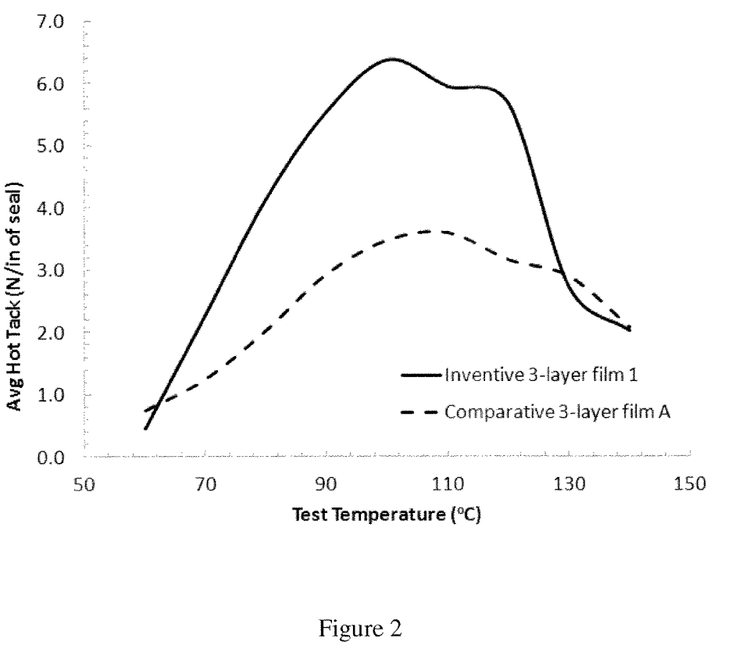
FIG. 2 is a graph illustrating the relationship between hot tack strength and test temperature of inventive three-layer film 1 and comparative three-layer film A.
Figure 3:
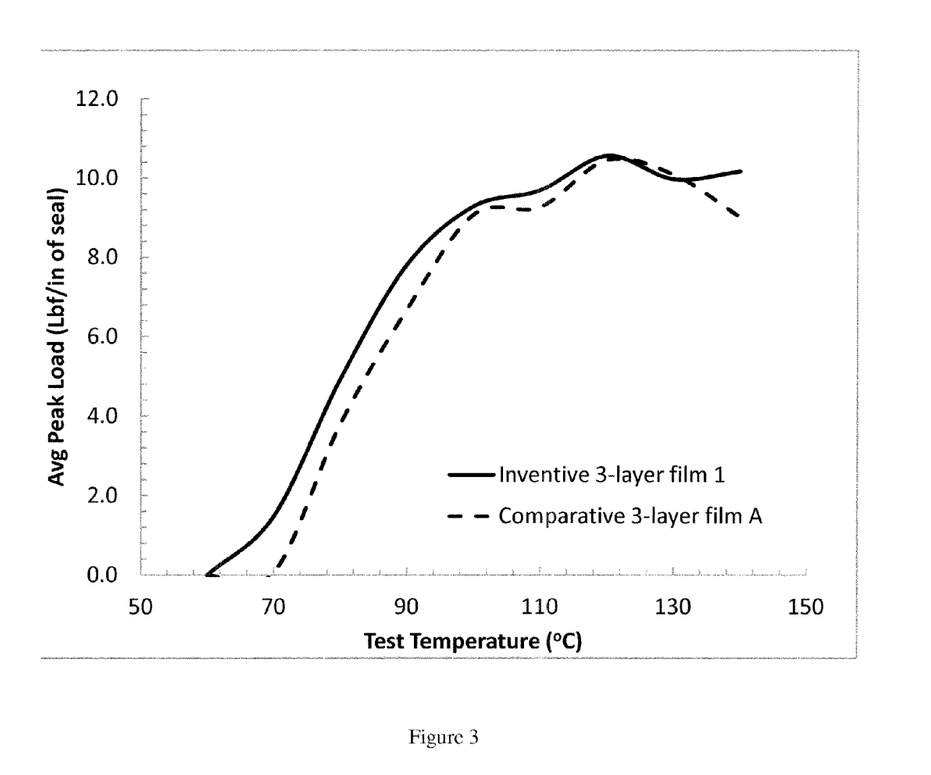
FIG. 3 is a graph illustrating the relationship between heat seal strength and test temperature of inventive three-layer film 1 and comparative three-layer film A.

The three parallel extruders 1-3 (2 Collin Type E25P single screw extruders and 1 Collin Type E30P single screw extruder) were fed into a single 10 inch wide film die with a die gap of approximately 10 mil (0.010 inches). The molten polymer was then extruded onto a polished stainless steel chill roll held at 25° C. The film was then passed through several rollers and onto a film winder. Inventive film 1 was tested for its hot tack strength and heat seal strength properties, and those properties are shown in FIGS. 2 and 3.

Comparative Film A

Comparative Film A was prepared via cast film process on a Collin cast film line (Type: Chill Roll, No. 4430-50-07) according to the process conditions reported in Table 4. Three-layer films were prepared by extruding (1) 25 percent by weight of a skin layer, based on the total weight of the three layer film, which was fabricated via extruder number 1, comprising Ultramid B40.01; (2) 50 percent by weight of a core layer, based on the total weight of the three layer film, which was fabricated via extruder number 2, comprising 90 percent by weight of ATTANE™ 4202 and 10 percent by weight of AMPLIFY™ GR-205, based on the total weight of the core layer; (3) 25 percent by weight of comparative LLDPE-A, as described above, based on the total weight of the three layer film, which was fabricated via extruder number 3.

The three parallel extruders 1-3 (2 Collin Type E25P single screw extruders and 1 Collin Type E30P single screw extruder) were fed into a single 10 inch wide film die with a die gap of approximately 10 mil (0.010 inches). The molten polymer was then extruded onto a polished stainless steel chill roll held at 25° C. The film was then passed through several rollers and onto a film winder. Comparative film A was tested for its hot tack strength and heat seal strength properties, and those properties are shown in FIGS. 2 and 3.

Inventive Extrusion Coated Film 1-a

Inventive Composition 1-a comprising (a) approximately 70 percent by weight of a linear low density polyethylene (LLDPE1), which is an ethylene-hexene interpolymer, having a density of approximately 0.908 g/cm$^3$, a melt index ($I_2$), measured at 190° C. and 2.16 kg, of approximately 21.1 g/10 minutes, a melt flow ratio ($I_{21}/I_2$) of approximately 27.5; and (b) approximately 30 percent by weight of a low density polyethylene (LDPE) having a density of approximately 0.918 g/cm$^3$, a melt index ($I_2$), measured at 190° C. and 2.16 kg, of approximately 2.3 g/10 minutes, wherein components a and b were dry blended (tumble blending until a homogenous blend is obtained, which may take approximately 30 minutes) for use in extrusion coating to form inventive polyolefin blend composition 1-a. All coating experiments are performed on a Black-Clawson extrusion coating/lamination line. The amount of neck-in (the difference in actual coating width versus deckle width) with a 6 inch air gap is measured at 440 fpm and 880 fpm resulting in 1 mil and 0.5 mil coatings respectively. Drawdown is the speed at which edge imperfections were noticed or that speed at which the molten curtain completely tears from the die. Although the equipment is capable of haul-off speeds of 3000 fpm, in these experiments the maximum speed used was 1500 fpm. Motor current is also recorded on the 150 horsepower 3½ inch diameter extruder during screw speeds of approximately 90 rpm resulting in 250 lb/h throughput. The observed neck-in and draw down properties for polyolefin blend composition 1-a, when formed into inventive extrusion coated film 1-a, as described above, is reported in Table 5.

Comparative Extrusion Coated Film A-1

Comparative Composition A-1 comprising (a) approximately 70 percent by weight of a linear low density polyethylene (LLDPE-A), which is an ethylene-octene interpolymer, having a density of approximately 0.908 g/cm$^3$, a melt index ($I_2$), measured at 190° C. and 2.16 kg, of approximately 21.6 g/10 minutes, a melt flow ratio ($I_{21}/I_2$) of approximately 22.0; and (b) approximately 30 percent by weight of a low density polyethylene (LDPE) having a density of approximately 0.918 g/cm$^3$, a melt index ($I_2$), measured at 190° C. and 2.16 kg, of approximately 2.3 g/10 minutes; wherein components a and b were dry blended (tumble blending until a homogenous blend is obtained, which may take approximately 30 minutes) for use in extrusion coating to form inventive polyolefin blend composition A-1. All coating experiments are performed on a Black-Clawson extrusion coating/lamination line. The amount of neck-in (the difference in actual coating width versus deckle width) with a 6 inch air gap is measured at 440 fpm and 880 fpm resulting in 1 mil and 0.5 mil coatings respectively. Drawdown is the speed at which edge imperfections were noticed or that speed at which the molten curtain completely tears from the die. Although the equipment is capable of haul-off speeds of 3000 fpm, in these experiments the maximum speed used was 1500 fpm. Motor current is also recorded on the 150 horsepower 3½ inch diameter extruder during screw speeds of approximately 90 rpm resulting in 250 lb/h throughput. The observed neck-in and draw down properties for polyolefin blend composition A-1, when formed into comparative extrusion coated film A-1, as described above, is reported in Table 5.

TABLE 1

|  | Unit | Inventive LLDPE 1 | Comparative LLDPE A |
|---|---|---|---|
| Density | g/cc | 0.908 | 0.908 |
| $I_2$ | g/10 min | 21.1 | 21.6 |
| $I_{21}$ | g/10 min | 579 | 475 |
| $I_{21}/I_2$ |  | 27.5 | 22.0 |

TABLE 1-continued

|  | Unit | Inventive LLDPE 1 | Comparative LLDPE A |
|---|---|---|---|
| Mn | g/mol | 16,393 | 18,142 |
| Mw | g/mol | 49,655 | 45,649 |
| Mz | g/mol | 106,744 | 87,985 |
| Mw/Mn |  | 3.03 | 2.52 |
| Mz/Mw |  | 2.15 | 1.93 |
| Eta* (0.1 rad/s) | Pa · s | 418 | 348 |
| Eta* (1.0 rad/s) | Pa · s | 419 | 343 |
| Eta* (10 rad/s) | Pa · s | 398 | 324 |
| Eta* (100 rad/s) | Pa · s | 290 | 249 |
| Eta* 0.1/Eta* 100 | Pa · s | 1.44 | 1.40 |
| Vinyls | per 1000 Carbons | 0.02 | 0.24 |
| ZSVR |  | 1.01 | 1.21 |

TABLE 2

|  | Unit | Inventive composition 1 | Comparative composition A |
|---|---|---|---|
| Density | g/cc | 0.912 | 0.910 |
| $I_2$ | g/10 min | 9.3 | 11.4 |
| $I_{10}$ | g/10 min | 71 | 85 |
| $I_{10}/I_2$ |  | 7.7 | 7.4 |
| Mn | g/mol | 13,738 | 15,571 |
| Mw | g/mol | 90,753 | 87,829 |
| Mz | g/mol | 471,740 | 471,074 |
| Mw/Mn |  | 6.61 | 5.64 |
| Melt strength | cN | 4.0 | 3.2 |

TABLE 3

|  | Inventive LLDPE 1 |
|---|---|
| Reactor Pressure (psi) | 348 |
| Bed Temperature (° C.) | 70 |
| $C_2$ Partial Pressure (psi) | 190 |
| $C_6/C_2$ Molar Ratio | 0.0164 |
| $C_6/C_2$ Flow Ratio | 0.1120 |
| $H_2$ ppm/$C_2$ mol % | 19.90 |
| $H_2$ PPM | 1043 |
| Isopentane (mol %) | 7.50 |
| Reactor Residence Time (hr) | 1.98 |

TABLE 4

| Extruder Conditions | Extruder 1 | Extruder 2 | Extruder 3 |
|---|---|---|---|
| Inlet temp (° C.) | 40 | 40 | 40 |
| Cylinder 1 Temp (° C.) | 225 | 225 | 200 |
| Cylinder 2 Temp (° C.) | 240 | 240 | 210 |
| Cylinder 3 Temp (° C.) | 245 | 245 | 245 |
| Cylinder 4 Temp (° C.) | 255 | 255 | 260 |
| Adapter Temp (° C.) | 265 | 265 | 260 |
| Melt Temp (° C.) | 247 | 248 | 252 |
| Screw speed (rpm) | 43 | 45 | 67 |
| Melt Pressure (bar) | 53 | 86 | 56 |
| Feed rate (kg/h) | 2 | 4 | 2 |
| Die Temp (° C.) | 280 | 280 | 280 |

TABLE 5

|  | Unit | Inventive polyolefin blend composition 1-a | Comparative polyolefin blend composition A-1 |
|---|---|---|---|
| Neck-in at 440 fpm | inches | 2.9 | 3.0 |
| Neck-in at 880 fpm | inches | 2.3 | 2.4 |
| Drawdown | fpm | >1500 | >1500 |

TABLE 5-continued

|  | Unit | Inventive polyolefin blend composition 1-a | Comparative polyolefin blend composition A-1 |
|---|---|---|---|
| Line speed | fpm | 440 | 440 |
| Extruder speed | rpm | 90 | 90 |
| Horsepowder | hp | 28 | 29 |
| Amperage | A | 130 | 127 |
| Melt Temperature | F. | 604 | 602 |
| Head Press | psi | 1284 | 1302 |

TEST METHODS

Test methods include the following:

Melt Index

Melt indices ($I_2$ and $I_{21}$) were measured in accordance to ASTM D-1238 at 190° C. and at 2.16 kg and 21.6 kg load, respectively. Their values are reported in g/10 min Density Samples for density measurement were prepared according to ASTM D4703. Measurements were made within one hour of sample pressing using ASTM D792, Method B.

Dynamic Shear Rheology

Samples were compression-molded into 3 mm thick×25 mm diameter circular plaques at 177° C. for 5 minutes under 10 MPa pressure in air. The sample was then taken out of the press and placed on the counter to cool.

Constant temperature frequency sweep measurements were performed on an ARES strain controlled rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method has an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic viscosity ($\eta$*), and tan ($\delta$) or tan delta were calculated.

Melt Strength

Melt strength measurements are conducted on a Gottfert Rheotens 71.97 (Goettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/second². The tensile force is recorded as a function of the take-up speed of the nip rolls. Melt strength is reported as the plateau force (cN) before the strand broke. The following conditions are used in the melt strength measurements: Plunger speed=0.265 mm/second; wheel acceleration=2.4 mm/s²; capillary diameter=2.0 mm; capillary length=30 mm; and barrel diameter=12 mm.

High Temperature Gel Permeation Chromatography

The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J. Polym. Sci.*, Polym. Letters, 6, 621 (1968)):

$$M_{polyethylene} = A \times (M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 µm above the desired testing gap (1.5 mm) Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

Vinyl Unsaturation

Vinyl unsaturation level is determined by a FT-IR (Nicolet 6700) in accordance with ASTM D6248-98.

$^{13}$C NMR

The samples were prepared by adding approximately 2.7 g of a 50/50 mixture of tetrachloroethane-d$_2$/orthodichlorobenzene containing 0.025 M Cr(AcAc)3 to 0.4 g sample in a Norell 1001-7 10 mm NMR tube, and then purging in a N2 box for 2 hours. The samples were dissolved and homogenized by heating the tube and its contents to 150° C. using a heating block and heat gun. Each sample was visually inspected to ensure homogeneity. The data were collected using a Bruker 400 MHz spectrometer equipped with a Bruker Dual DUL high-temperature CryoProbe. The data were acquired at 57-80 hours per data file, a 7.3 sec pulse repetition delay (6 sec delay+1.3 sec acquisition time), 90 degree flip angles, and inverse gated decoupling with a sample temperature of 120° C. All measurements were made on non spinning samples in locked mode. Samples were homogenized immediately prior to insertion into the heated (125° C.) NMR Sample changer, and were allowed to thermally equilibrate in the probe for 7 minutes prior to data acquisition. The branch number was calculated from the integral of the peak region at 32.7 ppm and its relative ratio of the peak of neat LDPE.

Film Testing Conditions

Hot Tack

Hot tack measurements on the film are performed using an Enepay commercial testing machines according to ASTM F-1921 (Method B). Prior to testing the samples are conditioned for a minimum of 40 hrs at 23° C. and 50% R.H. per ASTM D-618 (Procedure A). The hot tack test simulates the filling of material into a pouch or bag before the seal has had a chance to cool completely.

Sheets of dimensions 8.5" by 14" are cut from the three-layer coextruded laminated film, with the longest dimension in the machine direction. Strips 1" wide and 14" long are cut from the film [samples need only be of sufficient length for clamping]. Tests are performed on these samples over a range of temperatures and the results reported as the maximum load as a function of temperature. Typical temperature steps are 5° C. or 10° C. with 6 replicates performed at each temperature. The parameters used in the test are as follows:

Specimen Width: 25.4 mm (1.0 in)
Sealing Pressure: 0.275 N/mm$^2$
Sealing Dwell Time: 0.5 s
Delay time: 0.18 s
Peel speed: 200 mm/s The Enepay machines make 0.5 inch seals. The data are reported as a hot tack curve where Average Hot Tack Force (N) is plotted as a function of Temperature, as for example shown in FIG. 23. The Hot Tack Initiation temperature is the temperature required to achieve a pre-defined Minimum Hot Tack Force. This force is typically in the 1-2N range, but will vary depending on the specific application. The ultimate Hot Tack Strength is the peak in the hot tack curve. The Hot Tack Range is the range in temperature at which the seal strength exceeds the Minimum Hot Tack Force.

Heat Seal

Heat Seal measurements on the film are performed on a commercial tensile testing machine according to ASTM F-88 (Technique A). The Heat Seal test is a gauge of the strength of seals (Seal Strength) in flexible barrier materials. It does this by measuring the force required to separate a test strip of material containing the seal and identifies the mode of specimen failure. Seal Strength is relevant to the opening force and package integrity.

Prior to cutting, the films are conditioned for a minimum of 40 hrs at 23° C. (±2° C.) and 50% (±5%) Relative Humidity) per ASTM D-618 (procedure A). Sheets are then cut from the three-layer coextruded laminated film in the machine direction to a length of approximately 11 inches and a width of approximately 8.5 inches. The sheets are heat sealed across the machine direction on a Kopp Heat Sealer over a range of temperatures under the following conditions:

Sealing Pressure: 0.275 N/mm$^2$
Sealing Dwell Time: 0.5 s

The temperature range is approximately given by the Hot Tack Range (i.e. the temperature range over which at least a minimum hot tack seal is achieved and prior to the burn-through temperature).

The sealed sheets are conditioned for a minimum of 3 hours at 23° (±2° C.) and 50% R.H (±5%) prior to cutting into one inch wide strips. These strips are then further conditioned for a minimum of 21 hours at 23° (±2° C.) and 50% R.H (±5%) prior to testing.

For testing, the strips are loaded into the grips of a tensile testing machine at an initial separation of 2 inches mm and pulled at a grip separation rate of 10 inches/min at 23° (±2° C.) and 50% R.H (±5%). The strips are tested unsupported. Six replicate tests are performed for each sealing temperature.

Data reported is peak load, strain at peak load and failure mode.

We claim:

1. A polyolefin blend suitable for extrusion coating or extrusion lamination applications comprising:
   (a) a linear low density polyethylene composition comprising:
   less than or equal to 100 percent by weight of units derived from ethylene;
   less than 35 percent by weight of units derived from one or more α-olefin comonomers;
   wherein said linear low density polyethylene composition has a density in the range of 0.890 to 0.940 g/cm³, a molecular weight distribution ($M_w/M_n$) in the range of 2.5 to 4.5, a melt index ($I_2$) in the range of 4 to 30 g/10 minutes, a molecular weight distribution ($M_z/M_w$) in the range of from 2.0 to 3, vinyl unsaturation of less than 0.1 vinyls per one thousand carbon atoms present in the backbone of said composition, and a zero shear viscosity ratio (ZSVR) in the range from 1 to 1.2; and
   (b) less than 50 percent by weight of a low density polyethylene composition having a density in the range of 0.915 to 0.930 g/cm³, a melt index ($I_2$) in the range of 0.1 to 10 g/10 minutes, and a molecular weight distribution ($M_w/M_n$) in the range of 6 to 15.

2. An article comprising:
   a substrate, and
   a coating layer associated with at least one surface of said substrate comprising a polyolefin blend comprising:
   (a) a linear low density polyethylene composition comprising:
   less than or equal to 100 percent by weight of units derived from ethylene;
   less than 35 percent by weight of units derived from one or more α-olefin comonomers;
   wherein said linear low density polyethylene composition has a density in the range of 0.890 to 0.940 g/cm³, a molecular weight distribution ($M_w/M_n$) in the range of 2.5 to 4.5, a melt index ($I_2$) in the range of 4 to 30 g/10 minutes, a molecular weight distribution ($M_z/M_w$) in the range of from 2.0 to 3, vinyl unsaturation of less than 0.1 vinyls per one thousand carbon atoms present in the backbone of said composition, and a zero shear viscosity ratio (ZSVR) in the range from 1 to 1.2; and
   (b) less than 50 percent by weight of a low density polyethylene composition having a density in the range of 0.915 to 0.930 g/cm³, a melt index ($I_2$) in the range of 0.1 to 10 g/10 minutes, and a molecular weight distribution ($M_w/M_n$) in the range of 6 to 15.

* * * * *